United States Patent [19]

Bollenrath

[11] Patent Number: 4,699,740
[45] Date of Patent: Oct. 13, 1987

[54] STIRRING SYSTEM AND METHOD FOR INTRODUCING GASES TO LIQUIDS

[75] Inventor: Franz M. Bollenrath, Marl, Fed. Rep. of Germany

[73] Assignee: Huls Aktiengesellschaft, Marl, Fed. Rep. of Germany

[21] Appl. No.: 848,582

[22] Filed: Apr. 7, 1986

[30] Foreign Application Priority Data

May 4, 1985 [DE] Fed. Rep. of Germany ....... 3516027

[51] Int. Cl.$^4$ .............................................. B01F 3/04
[52] U.S. Cl. ...................................................... 261/93
[58] Field of Search ......................................... 261/93

[56] References Cited

U.S. PATENT DOCUMENTS

| | | | |
|---|---|---|---|
| 2,244,902 | 6/1941 | Stich | 261/93 |
| 2,530,814 | 11/1950 | Becze et al. | 261/93 |
| 2,628,827 | 2/1953 | Daman | 261/93 |
| 3,092,678 | 6/1963 | Braun | 261/93 |
| 3,400,051 | 9/1968 | Hofschneider | 261/93 |
| 3,572,661 | 3/1971 | Muller | 261/93 |
| 3,643,403 | 2/1972 | Speece | 261/93 |
| 3,827,679 | 8/1974 | Kaelin | 261/93 |

FOREIGN PATENT DOCUMENTS

| | | | |
|---|---|---|---|
| 756252 | 1/1971 | Belgium | 261/93 |
| 45-20067 | 7/1970 | Japan | 261/93 |
| 53-15706 | 5/1978 | Japan | 261/93 |

OTHER PUBLICATIONS

"Mixing: Theory and Practice", vol. I and II, Academic Press, New York and London, 1966 and 1967, edited by Vincent W. Uhl and Joseph B. Gray, pp. 180–209 and pp. 246–251.
"Ullmanns Encyklopädie der technishen Chemie", 4., neubearbeitete und erweiterte Auflage, Band 22, *Stahle bis Textilfarberei*, Verlag Chemie, Weinheim, Deerfield Beach, Florida, Basel, Prof. Dr. Dr. h. c. Ernst Bartholome et al, pp. 478–487.
"Ullmanns Encyklopädie der technishen Chemie", 4., neubearbeitete und erweiterte Auflage, Band 2, *Verfahrenstechnik I (Grundoperationen)*, Verlag Chemie, Weinheim/Bergstr., Prof. Dr. E. Bartholome et al, pp. 258–281.
"Fluid Mixing Technology", Chemical Engineering, McGraw-Hill Publications Co., N.Y., N.Y., Oldshue, James Y., Ph.D., pp. 58–61.
"Gas-Liquid Dispersion With Pitched Blade Turbines", *Chemical Engineering Communication*, vol. 25, Gordon and Breach Science Publishers, Inc., 1984, Marijn M. C. G. Warmoseskerken, Jan Speur, and John M. Smith, pp. 12–29.

*Primary Examiner*—Tim Miles
*Attorney, Agent, or Firm*—Oblon, Fisher, Spivak, McClelland & Maier

[57] ABSTRACT

A stirring system for dispersing gases in liquids, includes an upright mixing vessel with at least one baffle, a draft tube, and a stirring shaft with at least two stirrers, one of which stirrers is mounted at the upper end of the draft tube and the other at the lower end. The liquid into which the gases are to be introduced is charged into the mixing vessel to the extent that the liquid level lies above the upper edge of the draft tube and above the lower edge of the baffle or baffles.

17 Claims, 2 Drawing Figures

4,699,740

STIRRING SYSTEM AND METHOD FOR INTRODUCING GASES TO LIQUIDS

BACKGROUND OF THE INVENTION

1. Field of the Invention

The present invention relates to a method for introducing gases to liquids, and a stirring system for carrying out said method.

2. Discussion of the Background Art

The known stirring systems for introducing gases to liquids are of basically two types:

1. Stirring systems with external introduction of the gas where the gas is supplied via a simple tube or dispersion ring, having openings which open out in the lower part of the stirring vessel. The exiting gas is distributed into the liquid with the aid of a stirrer (e.g., a disc-type stirrer, an inclined plate or propeller-type stirrer, or a continuous stirrer). This system has the fundamental disadvantage of requiring a pump which must at least overcome the pressure of the liquid column. Further, if the gas stream is shut off, the liquid can penetrate into the gas dispersing system. Another disadvantage is that the stirrer can be bypassed, particularly at high gas flow rates; i.e., the stirrer is unable to completely disperse the gas exiting from the gas feed line. The result is pulse-loading of the entire stirring system, and thus elevated wear.

2. Self-suction stirring systems which have the advantage that there is lower pressure on the inclined stirring surfaces during stirring. If the stirring structure is configured as a tube, and gas is fed to it, the self-inducing action on the stirrer surfaces will cause the gas to pass outward. (See the description of the Ystral system and M. Zlokarnik, "Ruehrtechnik", in Ullmanns Encyklpaedie der technischen Chemie, 4th Ed. Vol. 2, pub. Verlag Chemie, Weinheim, FRG, 1972, pp. 259 ff., particularly pp. 275-278). The Ystral system is based on the fact that at a suitable stirrer rpm a decrease in pressure develops in the middle of the stirring mechanism, such that the gas can exit the tube.

Self-inducing systems require relatively high stirring power in order to achieve adequate gas dispersion. This is particularly true in cases in which there is a substantial vertical distance between the surface of the liquid and the stirrer. There is a limit on the maximum height difference, this limit being imposed by the laws of physics.

It is also known to provide a mixing vessel with a draft tube and a propeller stirrer, with the stirrer disposed within the guide tube, in order to achieve improved axial flow within the stirring vessel. Such systems are employed, e.g., for producing and maintaining solid-liquid and liquid-liquid interaction systems (See V. M. Uhl and J. B. Gray, "Mixing", Vol. II, pub. Academic Press, New York, London, 1967, pp. 247 ff.). Draft tubes are ordinarily used when it is desirable to substantially suppress the formation of a large funnel-type vortex in a cylindrical container, i.e., when it is desirable to avoid uptake of gas into the liquid as much as possible in the presence of good axial intermixing. Thus, the prior art suggests that stirring systems with draft tubes are not at all suitable for introducing gases to liquids.

Particular problems in introducing gases to liquids occur when the capacity of the liquid for the gas is relatively small or when the gas-liquid system tends to coalesce. In such cases, in order to employ the gas it is necessary to capture the gas which has not been absorbed by the liquid, and to reintroduce such gas to the liquid. Problems always arise when the liquid to which the gas is to be introduced substantially changes its material properties during the introduction of the gas.

Although numerous stirring systems have been proposed, a need continues to exist for an efficient stirring system for introducing gases to liquids.

SUMMARY OF THE INVENTION

Accordingly, it is an object of the present invention to devise a stirring system having the following properties:

1. It should operate without recycled gas.
2. There should be a possibility of avoiding flooding conditions, namely, non-stirrer engagement conditions as described above.
3. It should be possible to introduce a gas to a liquid in a uniform fashion where a height difference of at least 2 m exists between the surface of the liquid and at least part of the stirrer.
4. Even coalescing systems should be capable of undergoing satisfactory gas introduction over a relatively long time period.
5. The system should be capable of being built into ordinary upright stirring vessels which are presently available.

Other objects of the invention are a method for introducing gases to a liquid in which (1) the liquid into which the gases are to be introduced is charged into the mixing vessel to the extent that the liquid lies above the upper edge of the draft tube and above the lower edge of the flow alteration or breakup element or elements, (2) the degree of filling of the mixing vessel with the liquid into which the gas is to be introduced is limited such that a gas space will remain above the liquid at all times during operation, (3) the gas is fed into the lower end of the guide tube, (4) an $SO_2$-containing gas mixture, preferably with oxygen, is introduced into a solution of a 2,6-dialkylphenol in an organic solvent and this solution also contains a copperamine catalyst and possibly an activator, (5) a mixture of sulfur dioxide and oxygen is introduced into a mixture of paraffin and water.

The stirring system of the present invention achieves these and other objectives and includes an upright mixing vessel, a guide tube, a stirring shaft with at least two stirrers, and at least one passive flow alteration or breakup element.

BRIEF DESCRIPTION OF THE DRAWINGS

A more complete appreciation of the invention and many of the attendant advantage thereof will be readily obtained as the same becomes better understood by reference to an embodiment of the invention as shown in the Figures wherein.

DESCRIPTION OF THE PREFERRED EMBODIMENTS

Figure 1:
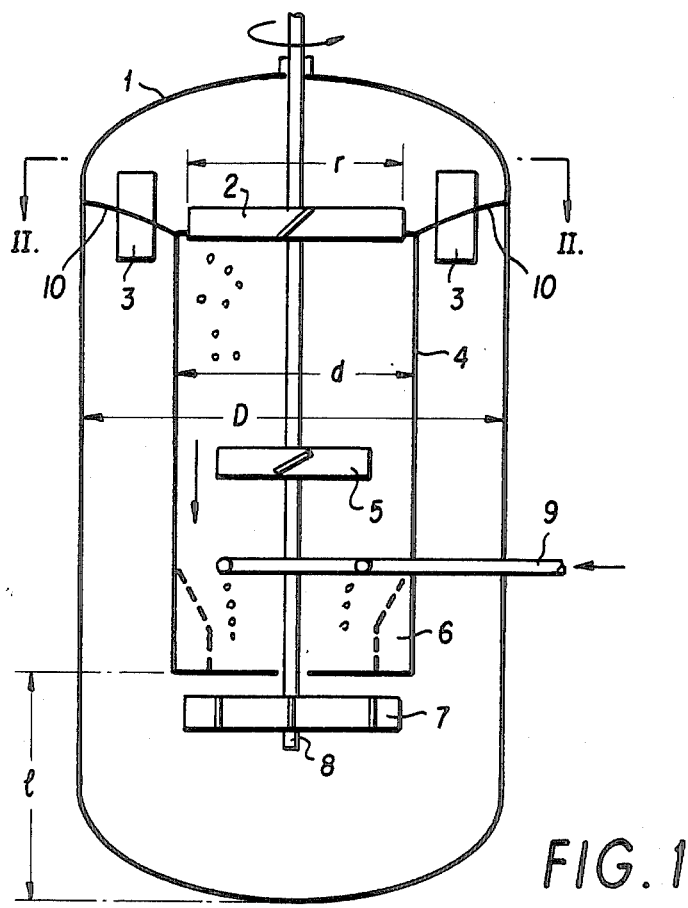
FIG. 1 is a schematic elevation of the apparatus for the invention.
Figure 2:
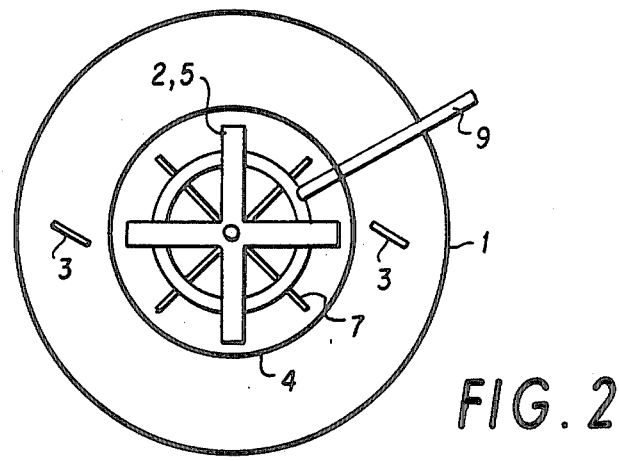
FIG. 2 is a sectional view along line II—II of FIG. 1.

The shape of the mixing vessel 1 is not critical; however, an upright cylindrical container is commonly used.

The draft tube 4 is cylindrical or conical in shape, and is mounted coaxially in the stirring vessel 1. The diameter d at the upper end of the draft tube is related to the diameter D of the stirring vessel 1 at the same height by the relation: $\frac{1}{3}D < d < \frac{2}{3}D$. If l is the distance of the bottom of the draft tube 4 from the bottom of the stirring vessel 1, it is preferable that the following relation applies: 0.3 D<l<0.5 D. In the case of a reaction with high heat evolution, it is often desirable to provide additional cooling surfaces. The draft tube 4 may itself serve as such an additional heat exchange surface. This is particularly advantageous because heat transfer at this location is particularly good as a consequence of the highly turbulent flow.

It has been shown to be advantageous to install guide plates 6 in the draft tube. These can further increase the effectiveness of the introduction of the gas into the liquid.

At least two stirrers 2 and 7 must be mounted on the stirring shaft.

The upper stirrer 2 preferably has the characteristics of a pitched blade dispersion stirrer. It is mounted on the stirring shaft 8 with its bottom edge below the upper edge of the draft tube 4, and is configured such that it forces the fluids in a downward direction. The diameter r of this stirrer 2 preferably follows the relation: 0.2 d<r<0.95 d.

The lower stirrer 7 is mounted in the lower part of the draft tube 7, or, preferably, underneath the draft tube 4. Ordinarily an axially transporting stirrer is employed as the upper stirrer 2. A radially transporting stirrer (e.g., a flat blade turbine or a Pfandlertype impeller) may be used as the lower stirrer 7. The distance of the lower stirrer 7 from the lower edge of the draft tube 4 should be as small as possible.

In coalescing systems, and in systems with high liquid height, it is recommended that one or more additional stirrers 5 (e.g., propellers or inclined blade turbines) be mounted therebetween the upper and lower stirrers 2 and 7.

An essential feature of the invention is one or more baffles 3.

These are mounted at a vertical position in the stirring vessel such that at least the upper edge of each such element 3, and preferably also the lower edge thereof, is disposed above the upper edge of the draft tube 4.

In carrying out the method it is advisable to fill the mixing vessel 1 (by means not shown) with a gas and with the liquid to which the gas is to be introduced, to an extent of fill, for example 10, such that the surface of the unstirred liquid is above the upper edge of the draft tube. At the same time, at least the lower edge of the baffles 3, immersed in the liquid. Furthermore, there should be an upper gas space in the mixing vessel at all times during the stirring operation. The gas is advantageously introduced into the lower part of the draft tube, because the distance between the feeding point and the dispersing mixer is then very short. If the gas supply is shut off, liquid may penetrate into the gas supply system. If this is undesirable, the gas may be alternatively supplied only in the upper gas space.

Upon rotation of the stirring shaft 8, the stirrers disperses the gas of the upper part of the vessel and the liquid. The gas-liquid mixture circulates downward through the draft tube 4 at which time absorbtion of gas by the liquid takes place. Fresh gas is fed at 9 advantageously in the lower part of the draft tube. Stirrer 7 disperses the fresh gas in the lower part of the vessel. The gas-liquid dispersion recirculates to the upper stirrer, reentering the draft tube 4. By means of the continuous dispersing of the gas in the liquid is achieved a high degree of absorption all over the vessel.

The present method may always find use in cases where it is difficult to disperse a gas in a liquid.

Examples of systems in which the invention might be employed are:

1. Oxidative coupling of ortho-disubstituted phenols to polyphenylene ethers (see e.g. Buehler, "Spezialplaste", pub. Akademieverlag, 1978; and Ger. OS 32 24 692).

2. The sulfonation of parafins by the light-water process, according to the following general reaction scheme:

$$RH + 2SO_2 + O_2 + H_2O \quad R - SO_3H + H_2SO_4$$

$$R - SO_3H + NaOH \quad RSO_3Na + H_2O$$

(see Ullmanns Encyklopaedie der technischen Chemie, 4th Ed., Vol. 22, pp. 478 ff., 1982).

The invention now being generally described, the same will be better understood with reference to certain particular examples which are intended for purposes of illustration only and are not intended to be limiting of the invention except where so indicated.

EXAMPLE 1

Batch Polymerization of 2,6-dimethylphenol to Polyphenylene Ether

To produce to cataylst, 15.6 g $CuCO_3.Cu(OH)_2$ was dissolved in 46 g 48 wt. % hydrobromic acid, and the resulting homogeneous solution is added under stirring to 240 g morpholine.

In a 10 liter reactor, 252 g of the catalyst solution, 8,280 g toluene, 1.318 g methanol and 1.910 g of a solution of 50 wt. % 2,6-dimethylphenol and 50 wt toluene were charged. Then, 39.4 g oxygen was introduced over a period of 1 hr. The reactor was stirred at 400 rpm with a three-stage stirrer in a draft tube. No gas was withdrawn. Then, the reaction was interrupted in customary fashion by addition of acetic acid (see e.g., Ger. OS No. 33 13 864).

EXAMPLE 2

Sulfonation by the Light-Water Process

In a reactor (see Figure) equipped with a plurality of mercury high pressure burners and having a total volume of 280 liter, water and fresh paraffin were continuously introduced and gaseous $SO_2$ and $O_2$ were continuously introduced. The mixture leaving the reactor comprised 25 parts paraffin and 1 part aqueous phase. This mixture was sent to a separator. A recycle stream was not necessary. There were no offgases.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent of the United States is:

1. A stirring system for introducing gases into liquids, comprising:
   an upright stirring vessel;
   gas inlet means;
   a substantially vertically extending draft tube in said vessel;

a substantially vertically extending stirring shaft in said draft tube;

means for impelling a liquid-gas mixture downward through said draft tube, said means for impelling comprising stirrers mounted on said stirring shaft, wherein said stirring shaft bears at least two of said stirrers, an upper stirrer positioned at the upper end of said draft tube proximate a gas space in said vessel, and a lower stirrer positioned at the lower end of said draft tube; and at least one flow rotation breakup element outwardly of said draft tube in said vessel, wherein said at least one flow rotation breakup element is mounted in the said stirring vessel at a vertical position such that at least the upper edge of said at least one flow rotation breakup element extends above the upper end of said draft tube.

2. The stirring system of claim 1, wherein the diameter of said draft tube at the upper end thereof is D/3 to 2D/3, where D is the diameter of said mixing vessel.

3. The stirring system of claim 1, wherein: $0.3D < l < 0.5 D$, where D is the diameter of said mixing vessel and l represents the distance of the bottom of said draft tube from the bottom of said mixing vessel.

4. The stirring system of claim 1, wherein said lower stirrer is at a distance D/2 to D/3 from the bottom of said mixing vessel.

5. The stirring system of claim 1, wherein said upper stirrer is a dispersion-type stirrer.

6. The stirring system of claim 1, wherein said lower stirrer is mounted beneath said draft tube and as closely as possible to the lower end of said draft tube, and is a radially transporting stirrer.

7. The stirring system of claim 1, wherein said upper stirrer is an axially transporting stirrer.

8. The stirring system of claim 1, wherein said draft tube is designed as a cooling element.

9. The stirring system of claim 1, including guide plates within said draft tube between said upper and said lower stirrers.

10. The apparatus of claim 1 wherein said draft tube extends to near a top of said vessel.

11. The apparatus of claim 1 wherein said flow rotation breakup element comprises means for creating a turbulent flow of said liquid.

12. A method for introducing gases into a liquid within an upright stirring vessel having therein a draft tube, a stirring shaft with stirrers and at least one flow rotation breakup element outwardly of said draft tube, wherein said stirring shaft bears at least an upper stirrer at the upper end of said draft tube proximate a gas space in said vessel, and a lower stirrer at the lower end of said draft tube, and wherein said at least one flow rotation breakup element is mounted in said stirring vessel at a vertical position such that at least the upper edge of said flow rotation breakup element extends above the upper end of said draft tube, said method comprising the steps of:

charging into said vessel a liquid into which gases are to be introduced to the extent that an upper liquid level lies above the upper edge of said draft tube and above the lower edge of said at least one flow rotation breakup element;

charging said gas into said vessel; and rotating said stirring shaft and stirrers so that a liquid-gas mixture is impelled downward through said draft tube and broken up by said flow rotation breakup element.

13. The method of claim 12, wherein said step of filling of said mixing vessel with the liquid into which the gas is to be injected is limited such that a gas space will remain above the liquid at all times during operation.

14. The method of claim 12, including the step of feeding said gas into the lower end of said draft tube.

15. The method of claim 12, wherein said gas comprises an $O_2$-containing gas mixture and said liquid comprises a solution of a 2,6-dimethylphenol in an organic solvent, and wherein said solution also contains a copperamine catalyst and an activator, if necessary.

16. The method of claim 12, wherein said gas comprises a mixture of sulfur dioxide and oxygen and said liquid comprises a mixture of paraffin and water.

17. The method of claim 12 wherein said draft tube is positioned sufficiently close to the upper liquid level that the gas thereabove is drawn into said draft tube by said stirrers.

* * * * *